Figure 2:
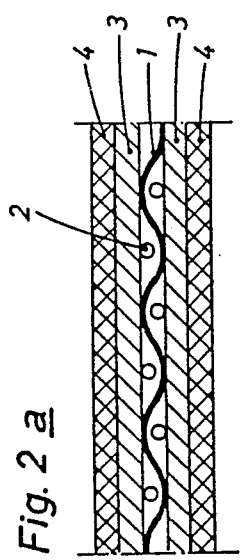
Figure 2:
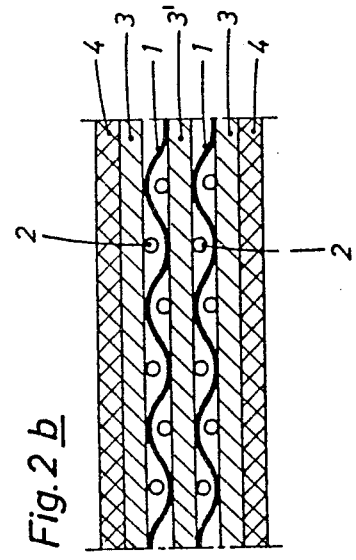

United States Patent [19]

Habegger

[11] Patent Number: 4,752,282
[45] Date of Patent: Jun. 21, 1988

[54] FLAT DRIVE BELT

[75] Inventor: Fernand Habegger, Biel-Benken, Switzerland

[73] Assignee: Habasit AG, Reinach, Switzerland

[21] Appl. No.: 841,585

[22] Filed: Mar. 20, 1986

Related U.S. Application Data

[63] Continuation of Ser. No. 564,314, Dec. 22, 1983.

[30] Foreign Application Priority Data

Jan. 6, 1983 [CH] Switzerland .............................. 70/83

[51] Int. Cl.$^4$ .................... B32B 25/02; B32B 25/04; F16G 1/04
[52] U.S. Cl. ..................................... 474/263; 156/137; 156/306.6; 428/246; 428/250; 428/252; 428/259; 474/264; 474/266; 474/271
[58] Field of Search .............................. 156/137, 306.6; 474/260, 263, 264, 266, 271; 428/246, 250, 252, 259

[56] References Cited

U.S. PATENT DOCUMENTS

| | | | |
|---|---|---|---|
| 2,514,429 | 7/1950 | Waugh | 474/251 |
| 3,252,484 | 5/1966 | Meyer et al. | 156/305 |
| 3,558,390 | 1/1971 | Habegger | 156/137 |
| 3,944,060 | 3/1976 | Hartmann | 474/261 |
| 4,109,543 | 8/1978 | Foti | 156/137 |
| 4,184,589 | 1/1980 | Habegger | 156/137 |
| 4,264,315 | 4/1981 | Imamura | 474/264 |
| 4,296,640 | 10/1981 | Nosaka | 474/264 |
| 4,371,580 | 2/1983 | Morrison et al. | 428/252 |

FOREIGN PATENT DOCUMENTS 744142 12/1952 United Kingdom .

OTHER PUBLICATIONS

Page 44 from F. M. Sokolowa and G. D. Tamulewitsch "Keilriemen" M. "Chemie", 1973.

Primary Examiner—Donald E. Czaja
Assistant Examiner—Lori Cuervo
Attorney, Agent, or Firm—Ralph W. Selitto, Jr

[57] ABSTRACT

The flat drive belt has a layered build-up comprising at least one tensile layer (1) which has a modulus of elasticity of 20,000–250,000 N/mm$^2$ and which is positively embedded between two thermoplastic hot-melt films (3) having a modulus of elasticity of 40–600 N/mm$^2$. Friction layers or friction structures (4) of an elastomer material having a modulus of elasticity of 2–40 N/mm$^2$ are built up on the hot-melt films (3).

The individual layers of the flat drive belt can be produced with high precision and, as a composite, form a sheet-like structure which is very regular with respect to thickness and weight per unit area. The starting material, produced as meter ware, for the flat drive belt can be cut without effort by the user from rolls and can be joined under the action of pressure and heat into a continuous form, without thickenings and joint gaps, in the way required for the kinematic behavior of fast-running drive belts.

29 Claims, 2 Drawing Sheets

FLAT DRIVE BELT

This is a continuation of application Ser. No. 564,314, filed Dec. 22, 1983.

The invention relates to a flat drive belt according to the preamble of patent claim 1.

A large number of flat drive belts made of natural materials, such as leather, cotton, rubber etc., have been disclosed in the state of the art. These have the disadvantage that they must be joined up to form a continuous belt by means of belt couplings or by sewing, and these can lead to premature destruction of the belt and the other components of the drive mechanism. In addition, the raw materials used here have a relatively low allowable fracture load or tearing load, which must then be compensated in most cases by larger belt cross-sections and correspondingly larger pulley diameters. Due to the centrifugal force losses, such belts cannot be used for high peripheral speeds.

Some years ago, a change to plastic flat drive belts was therefore made, which comprise molecularly oriented tensile layers of a defined width and thickness, composed of polyamide, polyester or the like, and one or two friction layers of, for example, leather or elastomers such as rubber, polyurethane etc. These flat drive belts can be made continuous by gluing or welding, without use of belt joints. If the belt ends overlap, unsteady running of the belt can admittedly also occur in this case. On the other hand, these drive belts show a substantially higher performance which is to be ascribed to the higher modulus of elasticity of the plastics used.

Drive belts have also been disclosed which are produced as a continuous piece, the tensile load-bearing layer being made as an endless band before application of the friction layer(s). This manufacturing process is involved and uneconomical, since a tensile layer specially sized for each belt length must be produced. Due to various process engineering defects occurring during manufacture, it has been found that such drive belts do not run sufficiently smoothly, in particular at relatively high peripheral speeds, for which they were actually designed.

Finally, to overcome such disadvantages, flat belts have been disclosed which are produced from homogeneous material by the casting process or injection-molding process. In addition to the high mold costs, these flat belts have been unable to gain acceptance for power transmission, in particular since the tensile strength or the coefficient of friction is unduly low.

It is therefore the aim of the invention to provide a flat drive belt which does not have the abovementioned disadvantages. The object to be achieved here is to provide a drive belt which has both a high tensile strength and high coefficients of friction and the layer components of which are irreleasably joined to one another to give an integral compact structure.

The achievement, according to the invention, of this object is given by patent claim 1. Advantageous embodiments thereof are defined by the dependent claims.

In the constructional design of the flat drive belt according to the invention, it was possible to obtain a number of surprising results, by virtue of which existing frontiers in drive technology can be crossed and completely new possibilities for the layout and design of drives can be developed. With the belt structure according to the invention, having a tensile layer of aramide fibers, carbon fibers, or polyvinyl alcohol fibers and with glass fibers, and having a modulus of elasticity of 20,000–250,000 N/mm$^2$, a neutral zone with a melting point or decomposition point above 230° C. was obtained. Those thermoplastic hot-melt films located on both sides of the tensile layer have proved suitable which comprise a single thermoplastic or a mixture of plastics and have a modulus of elasticity of 40–600 N/mm$^2$ and a softening range from 140° to 180° C. An elastomer friction layer having a modulus of elasticity of 2–40 N/mm$^2$ and a decomposition point above 200° C. is applied to at least one such hot-melt film. When a layer structure comprising such components is introduced into a press, with application of pressure and heat, the hotmelt films of a thermoplastic or a mixture of plastics having a softening range from 140° to 180° C., that is to say a far lower melting or decomposition point than those of the tensile carriers or the friction layers, fuse together to give an interlocking sheet-like structure. For process engineering reasons, it was found to be appropriate to hold the elongate fiber elements of the tensile layer together by means of a weft material. The hot-melt films and the weft materials can thus fuse during the processing step to give advantageous material combinations.

In this manufacturing technology, the belt material is obtained as meter ware of large dimensions, from which flat drive belts of any desired length and width can be cut. That high production accuracy and material uniformity which are required for excellent kinematic behavior of high-speed drive belts in operation can be obtained in a simple manner over the entire length and width of the sheet-like belt material. As shown by tests described later, it was impossible to obtain similar smooth behavior with known drive belts. It was also shown in practice that, due to the high modulus of elasticity of the tensile layer, the flat drive belt according to the invention can be kept thinner and lighter than known embodiments. Depending on the operating characteristics and the power transmission capacity demanded, it can be advantageous to divide the tensile layer into several plies of the fiber material having a high modulus of elasticity and to embed these plies between thermoplastic hotmelt films. For example, antistatic properties can be imparted to the thermoplastic hot-melt films by admixing carbon black. Unless both outer layers of the belt are provided with elastomer friction layers, the hot-melt film "remaining free" can itself be constructed as a friction layer, if necessary by means of profiling.

Figure 3:
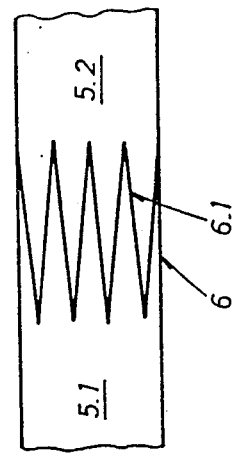
Figure 1A:
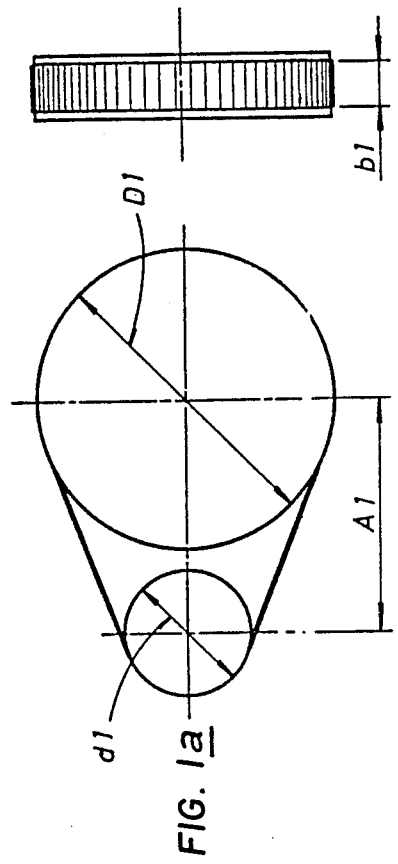
Figure 1B:
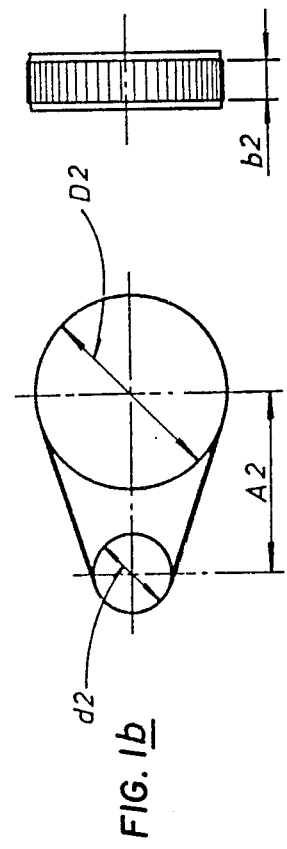
Figure 1C:
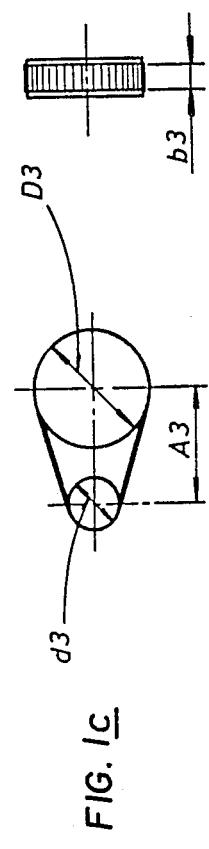
Figure 4:
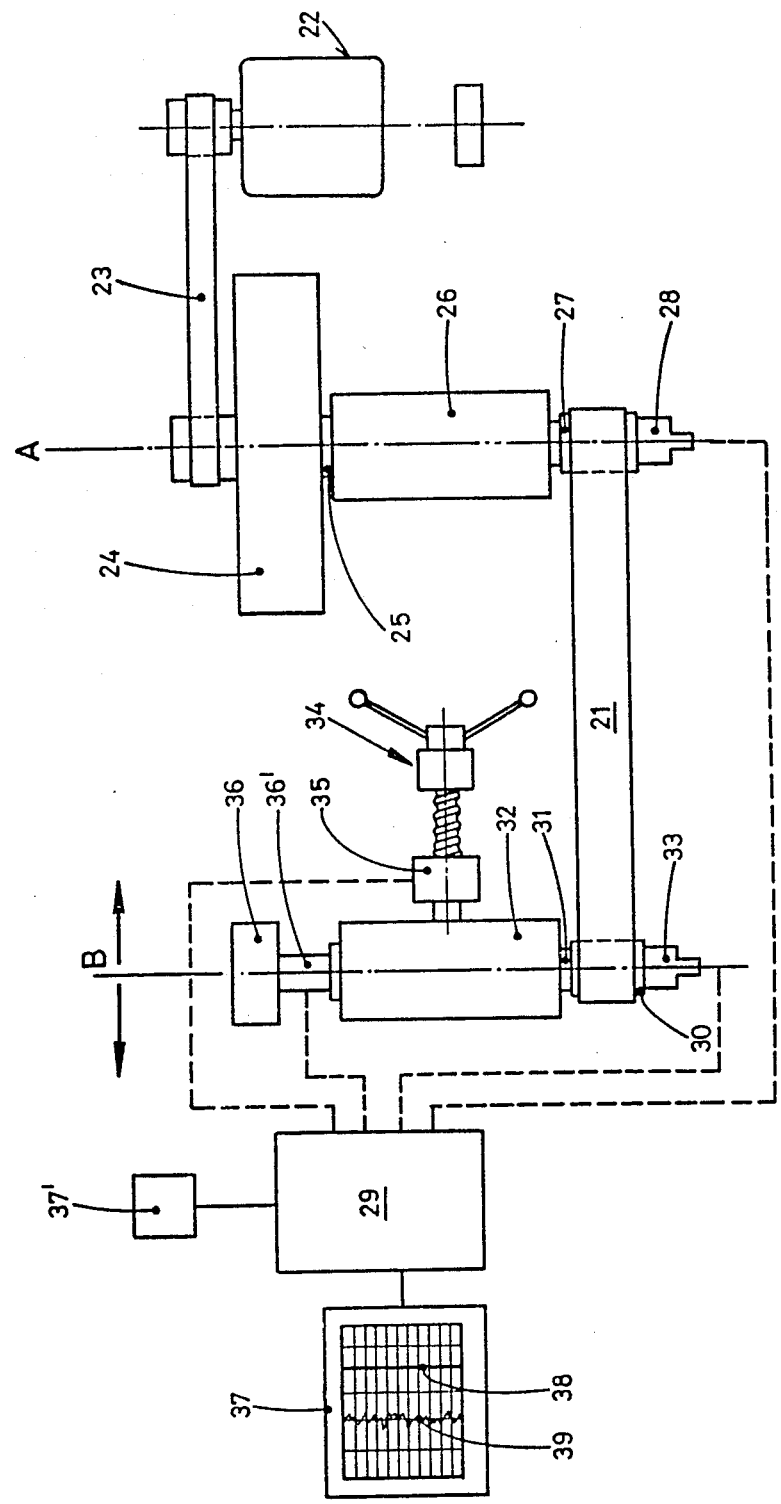

The invention is explained below by way of example, with reference to the drawing in which:

FIG. 1 diagrammatically shows the relative sizes of three flat drive belt gears for the transmission of a power of 55 kw at 1500 min$^{-1}$ of the smaller pulley with a transmission ratio of 1:2.5, namely with the use of (a) a butt leather belt according to DIN 111-2, sharpened and glued to give a continuous form, (b) a modern plastic flat drive belt with a rubber friction layer, sharpened and glued to give a continuous form, and (c) a flat drive belt according to the invention with thermoplastically welded belt ends, FIGS. 2a and 2b show diagrammatic cross-sectional illustrations of two typical layer structures of the flat drive belt according to the invention, FIG. 3 shows a plan illustration of a closing joint by indentation, and FIG. 4 diagrammatically shows a test rig for determining the magnitude of the rotational deviation of a flat drive belt.

The illustration shown in FIG. 1 in approximately proportional sizes for the selected gear types:

| transmitted power | 55 kw |
|---|---|
| speed of rotation of the smaller pulley | 1500 min$^{-1}$ |
| transmission ratio | 1:2.5 | gives, in the form of a table, the following dimensions:

TABLE I

| Type of drive belt | Pulley diameter $D_1 \div D_3$ mm | Belt width $d_1 \div d_3$ mm | $b_1 \div b_3$ mm | Minimum axle distance $A_1 \div A_3$ mm |
|---|---|---|---|---|
| (a) Butt leather drive belt according to DIN 111-2 | 1,000 | 400 | 180 | 970 |
| (b) Plastic flat drive belt of conventional type | 630 | 250 | 165 | 600 |
| (c) Flat drive belt according to the invention | 400 | 160 | 105 | 380 |

The above dimensions given for the flat drive belt (c) according to the invention can be kept even smaller when the layer materials are employed in a manner specific to the application. In particular, both the pulleys $D_3$ and $d_3$ and the belt width $b_3$ can be further reduced for the same transmitted power, if multi-ply tensile layers are used.

In FIG. 2a, 1 marks the tensile layer of a material having a modulus of elasticity of the order of magnitude of 20,000–250,000 N/mm$^2$, for example aramide fibers, carbon fibers, or polyvinyl fibers or combinations of these materials with glass fibers. In the case of using aramide fibers, those having a modulus of elasticity of 70–140,000 N/mm$^2$ proved to be suitable. In the region of the tensile layer, a neutral zone having a melting point or decomposition point above 230° C. is obtained. The fibers of the tensile layer 1 are fixed by means of a weft material 2, for example polyester threads or polyamide threads, in order to obtain a uniform distribution over the entire width of the drive belt. 3 marks thermoplastic hot-melt films which are fitted on both sides of the tensile layer 1 and which are composed of a single plastic material, or of a mixture of plastic materials, having a softening range of 140°–180° C. The plastic material is preferably a polyamide copolymer having a modulus of elasticity of 200–400 which, under the effects of pressure and heat, combines chemically with the weft thread material. In the symmetrical structure shown in FIG. 2a, each of the hot-melt films 3 is provided with a friction coating 4 composed of an elastomer, preferably a nitrile rubber having a modulus of elasticity of 2–40 N/mm$^2$. In an asymmetrical drive belt structure, one of the friction coatings 4 can be omitted. If desired, one or both friction coatings 4 can also be provided as friction-enhancing structural patterns embossed into the surface of the hot-melt coatings 3. In this case, it is preferable to select, for the hot-melt films 3, a mixture of plastic materials which itself has elastomeric properties. It is to be understood that substantial reductions in thickness, and hence an increase in the flexibility of the drive belt, can be obtained by omitting actual friction coatings and incorporating a friction-enhancing structural pattern into the surface of the hot-melt coatings 3. Since the modulus of elasticity of an actual friction coating is naturally low, it virtually does not contribute anything to the allowable tensile load on the drive belt.

FIG. 2b shows a flat drive belt structure with two tensile layers 1 which are each by itself fixed by means of weft materials 2, as described with reference to FIG. 2a. The tensile layers 1,1 are separated from one another by a central thermoplastic hot-melt film 3'. Regarding the friction coatings 4, the same comments apply in principle as those given above with reference to FIG. 2a.

The thermoplastic hot-melt films 3 are composed of a material which, both with the weft material 2 and with the elastomeric friction layers 4 which may be present, forms an indissoluble layer structure under the action of heat and pressure. The materials of the tensile layer 1 including the weft threads 2, of the friction coatings 4 and of the hot-melt films 3 have, in this order, melting or decomposition points which tend from higher to lower values, in order to enable an integral sheet-like structure to be formed.

The thickness of the individual layers can be selected in accordance with the desired belt characteristics. However, it remains constant for each layer over the entire length of the belt, within a small variation tolerance, in order to obtain the same overall thickness, flexibility and strength values everywhere. Properties such as the coefficient of friction and the abrasion resistance of the friction layers or friction structures can be readily adapted to individual demands, if necessary by providing a structured profile.

To obtain optimum running properties, in particular in the upper speed range, a virtually interruption-free joint of the belt ends is indispensable. To retain the full flexibility even at the junction, no adhesive or welding additives are used in the flat drive belt according to the invention for making the joint. As an example, FIG. 3 shows an indentation end joint 6 between the belt ends 5.1 and 5.2, the punchings 6.1 being inserted in abutting engagement into a press, where the hotmelt films 3, 3' are caused to flow under pressure and at a heat of 140° to 180° C., the homogeneity of the material being fully preserved. Such an end joint can be made in a simple manner without a significant loss of strength, eVen by unspecialized personnel. This enables the user to hold the starting material for the belt in stock on rolls and to cut any desired lengths thereof at any time for making a drive belt.

For a comparison with the flat drive belt according to the invention, three specimens were examined, analogously to the comparison of the constructional sizes:

Specimen No. 1: Butt leather drive belt according to DIN 111-2, sharpened and glued to make it continuous;

Specimen No. 2: Plastic flat drive belt of known design with a rubber friction layer, sharpened and glued to make it continuous; and Specimen No. 3: flat drive belt according to the invention, thermally welded (welded joint according to FIG. 3).

In a first test series, values relating to the preparation time and the strength of the drive belt joints were determined in accordance with Table II, namely (A) the time in minutes, taken for joining the belt ends, with the aid of optimum shaping means and a heated press, and, (B) the fatigue life of the joint of the belt ends, expressed as operating hours, determined by a fatigue strength test under completely reversed bending stress, according to a modification of the test procedure of DIN 53,442.

TABLE II

| Type of joint | Specimen | | |
| --- | --- | --- | --- |
| | No. 1 | No. 2 | No. 3 |
| (A) Preparation time (minutes) | 90 | 30 | 10 |
| (B) Fatigue life (operating hours) | 50 | 120 | 480 |

Table II thus clearly shows the economic advantages of the flat drive belt according to the invention.

A further comparison of the flat drive belt according to the invention (specimen No. 3) with flat drive belts of conventional type (specimens No. 1 and 2) relates, according to Table III, to power losses caused by bending and flexing work and by slip, to the generation of noise and to belt extension. In the last-mentioned test, the power transmitted was 55 kw, as mentioned, at a speed of rotation of the small pulley of 1500 min$^{-1}$.

TABLE III

| Property tested | Specimen | | |
| --- | --- | --- | --- |
| | No. 1 | No. 2 | No. 3 |
| Specific power loss in kw, relative to the leather drive belt = 1 | 1 | 0.5 | 0.4 |
| Noise generated, dBA | 90 | 88 | 84 |
| Belt extension % | 3.2 | 2.6 | 0.3–0.8 |

These measured values were determined with pulleys, the diameters of which were stepped approximately in the ratio of the pulley diameters in accordance with Table I for the specimens No. 1 to 3. For the specimen No. 3, far better results are obtained with the same pulley diameters as for the specimens No. 1 and 2. Overall, it can clearly be concluded from this that flat drive belts according to the invention are also suitable for extremely small pulley diameters. The extremely small belt extension enables the machine builder to provide very short spans and hence to lay out very compact drives.

The easily maintainable high precision in the production of the individual layers and hence of the complete belt structure, the precisely definable physical properties of the materials to be joined to one another over the entire length of the drive belt and the virtually homogeneous junction also have an effect in favor of the characteristics of rotational deviation and of the uniformity of running, so that the result is a virtually homokinetic transmission of force. The latter is of very great importance for qualitatively high-grade drive belt mechanisms and gears.

A rig for determining the rotational deviation is diagrammatically shown in FIG. 4. By means of this, the degree of homokinetic force transmission by means of a test belt 21 can be checked relatively easily. By means of an auxiliary belt 23, a motor 22 infinitely adjustable from 0 to 3000 min$^{-1}$ drives a flywheel mass 24, the shaft 25 of which is rotatably mounted in a precision bearing 26. The auxiliary belt 23 and the flywheel mass 24 damp any rotary vibrations which may originate from the drive motor, the shaft bearing 26 or the reaction of the test belt 21, in such a way that an at least approximately uniform rotary motion of the flywheel 24 results. On its end remote from the flywheel mass 24, the shaft 25 carries a pulley 27 fixed thereon (on the input side), the revolving motion of which can thus be designated as virtually free of rotational deviation. The incremental uniformity of the rotary motion of the pulley 27 is monitored by rotary vibration pick-up 28, the output signal of which is fed to an electronic measuring system 29.

The rotary motion of the pulley 27 on the input side is transmitted by the test belt 21 to a pulley 30 on the output side, which is solidly seated on a second shaft 31 which is rotatably mounted in a second precision bearing 32 guided in parallel. The second shaft carries a second rotary vibration pick-up 33, the output signal of which is likewise fed to the electronic measuring system 29. The distance between the precision bearings 26, 32 is adjustable in the direction of the arrow by means of a tensioning device 34, corresponding to the length of the test belt. The belt tension or the incremental values is or are monitored by means of a force-measuring cell 35. The signals emitted by the latter are also passed to the electronic measuring system 29. A variable load 36, from which load-dependent signals from a load-measuring arrangement 36' are also fed to the electronic measuring system 29, can be coupled to the shaft 32 on the output side.

The electronic measuring system 29 is connected to a recorder 37, by means of which the signals generated in the rotary vibration pick-ups 28 and 33 and also in the force-measurement box 35 and in the load-measuring arrangement 36' are rendered visible as analog tracks. The latter signals can also be rendered visible as numerical values by means of a digital display 37'.

With the measuring rig according to FIG. 4 in operation, the test belt 21 transmits the virtually uniform rotary motion input from the pulley 27 to the pulley 30 on the output side. The signal of the rotary vibration pick-up 28 appears in the recorder 27 as a virtually straight line 38. The uniformity of the transmission of motion depends on the geometrical structure of the belt, its internal visco-elastic properties and its tribological characteristic data. It can be directly read from the analog representation 39 recorded in the recorder 37, where the signals emitted by the rotary vibration pick-up 33 are recorded as a rotational deviation in minutes of angle. A rotary motion is regarded as free from rotational deviation, that is to say as fully uniform, if it proceeds at a constant angular velocity of $\omega = 2\pi n = $ constant, n being the speed of rotation.

Table IV which follows lists data from the testing of the drive belt specimens No. 1 to 3, as mentioned, for rotational deviation, which data clearly demonstrate the improvements achievable by the drive belt of the structure according to the invention over the commercially available drive belts. The diameter of the pulleys 27, 30 was 112 mm in all the test runs, and the tests ran under idling conditions, that is to say the load to be transmitted by the drive belts corresponded only to the idling losses on the driven side of the measuring rig.

TABLE IV

| Specimen No. | | Drive belt dimensions | | | Rotational deviation in minutes of angle at | |
| --- | --- | --- | --- | --- | --- | --- |
| | | Overall thickness or layer build-up mm | Width mm | Length of the loop mm | 1,000 min$^{-1}$ | 3,000 min$^{-1}$ |
| 1 | Butt leather drive belt according to DIN 111-2 | 5.0 | 40 | 1.500 | 8.1 | 6.7 |
| 2 | Plastic flat drive belt state of the art | 2.8 | 40 | 1.500 | 5.7 | 3.9 |
| 3 | Flat drive belt according to the invention | 2.1 | 40 | 1.500 | 2.5 | 1.2 |

I claim:

1. A method of making a flat multi-ply drive belt, comprising the steps of:

providing a fabric formed from warp fibers extending in a generally longitudinal direction and having a modulus of elasticity in a range of from about 20,000 N/mm$^2$ to about 250,000 N/mm$^2$, said warp fibers being made from a material having a first melting point, and weft fibers extending in a generally transverse direction, said weft fibers being made from a material having a second melting point which is lower than said first melting point;

positioning said fabric between a first layer of thermoplastic material and a second layer of thermoplastic material, the thermoplastic material of said first and second layers having a third melting point which is lower than said second melting point, whereby a multi-ply assembly is formed; and subjecting said multi-ply assembly to temperature and pressure conditions selected such that said weft fibers are non-releasably bonded to said first and second layers, whereby said multi-ply assembly is transformed into an integral sheet-like structure, and such that said warp fibers are not bonded to said first and second layers or to said weft fibers, whereby said warp fibers form a tensile layer whose flexibility is enhanced by reason of the non-bonding of said warp fibers to said weft fibers and to said first and second layers of thermoplastic material.

2. The method of claim 1, wherein the longitudinal warp fibers are comprised of aramide fibers, carbon fibers, glass fibers, steel wire, polyvinylalcohol fibers, or mixtures thereof.

3. The method of claim 2, wherein the longitudinal warp fibers comprise aramide fibers having a modulus of elasticity of about 70,000 to 140,000 N/mm$^2$.

4. The method of claim 1, wherein the longitudinal warp fibers have a melting point above about 230 degrees C.

5. The method of claim 1, wherein the weft fibers are made from polyester fibers and/or polyamide fibers.

6. The method of claim 1, wherein the thermoplastic material has a modulus of elasticity of about 40 to 600 N/mm$^2$.

7. The method of claim 1, wherein the thermoplastic material has a melting point of about 140 to 180 degrees C.

8. The method of claim 7, wherein the hot pressing step is performed at a temperature of about 140 to 180 degrees C.

9. The method of claim 1, wherein the belt contains a friction layer on at least one outside surface and the friction layer comprises a thermoplastic material with friction-enhancing properties produced therein by surface structuring.

10. The method of claim 1, wherein the belt contains a friction layer on at least one outside surface and the friction layer comprises a material which is different from the thermoplastic material and which is added to said outside surface prior to said hot pressing step.

11. The method of claim 10, wherein the friction layer material has a modulus of elasticity of about 2 to 40 N/mm$^2$.

12. The method of claim 10, wherein the friction layer material comprises an elastomer.

13. The method of claim 10, wherein there are two friction layers on opposite outside surfaces of the belt.

14. The method of claim 1, wherein there are two or more tensile layers, adjacent tensile layers being separated by a layer of thermoplastic material.

15. The method of claim 1, wherein the layers of thermoplastic material have antistatic properties.

16. A flat multi-ply drive belt, comprising a fabric formed from warp fibers extending in a generally longitudinal direction and having a modulus of elasticity in a range of from about 20,000 N/mm$^2$ to about 250,000 N/mm$^2$, said warp fibers being made from a material having a first melting point, and weft fibers extending in a generally transverse direction, said weft fibers being made from a material having a second melting point which is lower than said first melting point;

a first layer of thermoplastic material positioned on one side of said fabric; and a second layer of thermoplastic material positioned on an opposite side of said fabric, the thermoplastic material of said first and second layers having a third melting point which is lower than said second melting point such that said first and second layers of thermoplastic material are non-releasably bonded by the application of heat and pressure to said weft fibers but not to said warp fibers, whereby said warp fibers form a tensile layer whose flexibility is enhanced by reason of the non-bonding of said warp fibers to said weft fibers and to said first and second layers of thermoplastic material.

17. The drive belt of claim 16, wherein the longitudinal warp fibers are comprised of aramide fibers, carbon fibers, glass fibers, steel wire, polyvinylalcohol fibers, or mixtures thereof.

18. The drive belt of claim 17, wherein the longitudinal warp fibers comprise aramide fibers having a modulus of elasticity of about 70,000 to 140,000 N/mm$^2$.

19. The drive belt of claim 16, wherein the longitudinal warp fibers have a melting point above about 230 degrees C.

20. The drive belt of claim 16, wherein the weft fibers are made from polyester fibers and/or polyamide fibers.

21. The drive belt of claim 16, wherein the thermoplastic material has a modulus of elasticity of about 40 to 600 N/mm$^2$.

22. The drive belt of claim 16, wherein the thermoplastic material has a melting point of about 140 to 180 degrees C.

23. The drive belt of claim 16, wherein the belt contains a friction layer on at least one outside surface and the friction layer comprises a thermoplastic material with friction-enhancing properties produced therein by surface structuring.

24. The drive belt of claim 16, wherein the belt contains a friction layer on at least one outside surface and the friction layer comprises a material which is different from the thermoplastic material.

25. The drive belt of claim 24, wherein the friction layer material has a modulus of elasticity of about 2 to 40 N/mm$^2$.

26. The drive belt of claim 24, wherein the friction layer material comprises an elastomer.

27. The drive belt of claim 24, wherein there are two friction layers on opposite outside surfaces of the belt.

28. The drive belt of claim 16, wherein there are two or more tensile layers, adjacent tensile layers being separated by a layer of thermoplastic material.

29. The drive belt of claim 16, wherein the layers of thermoplastic material have antistatic properties.

* * * * *